(12) United States Patent
Diekhans et al.

(10) Patent No.: US 6,247,510 B1
(45) Date of Patent: Jun. 19, 2001

(54) APPARATUS FOR THE CONTROL OF A TRANSFER DEVICE

(75) Inventors: Norbert Diekhans; Jochen Huster, both of Gütersloh; Christoph Bussmann, Harsewinkel; Sebastian Gamble, Bielefeld, all of (DE)

(73) Assignee: Claas Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 09/420,429

(22) Filed: Oct. 19, 1999

(30) Foreign Application Priority Data

Oct. 19, 1998 (DE) ................................................ 198 48 127

(51) Int. Cl.[7] .............................. B65B 3/04; B65B 1/04; B65B 37/00; B67C 3/00
(52) U.S. Cl. .............................. 141/231; 141/67; 141/94; 141/95; 141/192; 141/198; 56/16.6; 414/335
(58) Field of Search ................................. 141/67, 94, 95, 141/192, 198, 231; 414/334, 335, 340; 56/16.6

(56) References Cited

U.S. PATENT DOCUMENTS

| | | | |
|---|---|---|---|
| 3,786,945 | * 1/1974 | Symonds | 56/16.6 |
| 4,376,609 | * 3/1983 | Bohman et al. | 414/335 |
| 4,529,348 | * 7/1985 | Johnson | 414/335 |
| 5,359,838 | * 11/1994 | Madsen | 56/16.6 |
| 5,575,316 | 11/1996 | Pollklas | 141/198 |
| 5,749,783 | 5/1998 | Pollklas | 460/119 |

* cited by examiner

Primary Examiner—Timothy L. Maust
(74) Attorney, Agent, or Firm—Husch & Eppenberger, LLC; Robert E. Muir; Kevin M. Kercher

(57) ABSTRACT

The transfer device of an agricultural harvester, in particular a self-propelled forage harvester, is controlled to avoid crop loss and improve operating efficiency. The harvested crop is transferred from the agricultural harvester to a transport receptacle via an upper discharge chute. Apparatus controls the pivoting and vertical movement of the transfer device while the crop stream is spewed in a manner to avoid crop loss and improve the filling capacity during the transfer. The angle between the pivotable transfer device and the longitudinal direction of the agricultural harvester is calculated from the quantity of the correcting value to predetermine the direction of travel of the agricultural harvester. During travel, the apparatus is effective even during a curved path of travel.

17 Claims, 4 Drawing Sheets

APPARATUS FOR THE CONTROL OF A TRANSFER DEVICE

BACKGROUND OF THE INVENTION

The present invention relates generally to agricultural machines and more particularly to an apparatus for controlling a transfer device on an agricultural machine such as a self-propelled forage harvester. The transfer device transfers crop from the agricultural machine to a transport receptacle.

European patent document EP 0 131 693 A1 discloses a control system for a discharging connector. The apparatus described relates to an agricultural harvester towing a transport receptacle via a hitch. By means of the connector, the chopped crop is transferred from the agricultural harvester to the transport receptacle. The relative angle between the hitched transport receptacle and the agricultural harvester is detected at the coupling point. With reference to this angle, the connector is controlled according to a given program in such a way that the crop always enters the transport receptacle. The relative angle between the connector and agricultural harvester is determined and conveyed to a control system.

A disadvantage with this apparatus is that the relative angle between the agricultural harvester and the hitched transport receptacle must be detected. Mechanical sensing devices without play and with high-resolution sensors, or optical scanning means are necessary. When the transport receptacle is loaded with crop, it is unhitched and replaced with an empty transport receptacle. The mechanical sensing device must be recoupled and adjusted. For an optical scanning device, it is necessary for each transport receptacle to be fitted with a corresponding reflector means.

German patent document DE 44 03 893 A1 discloses an apparatus for filling transport receptacles, a control system for a transfer device and a limit switch contact means to control prefixed relative angle positions of an upper discharge chute to the longitudinal direction of the agricultural harvester. The transfer device is controlled with the aid of optical or acoustic distance measuring devices which determine and measure the degree of filling of the transport receptacle. The degree of filling of the receptacle is determined by several sensors near the instantaneous crop impingement point on the transport receptacle by means of distance signals. When a given level is reached, the transfer device is pivoted until an adjacent point which exhibits a lower level is detected.

A disadvantage of this transfer control system is the very expensive distance sensors. Moreover, this apparatus only works satisfactorily when the crop stream is approximately spewed in the direction of the distance measuring device (i.e. when the crop stream is approximately perpendicular to the transport receptacle floor). If the crop is transferred to a transport receptacle hitched to a self-propelled agricultural harvester or trailed behind the agricultural harvester by a towed receptacle, this loading apparatus fails. The failure is caused by the direction and transfer distance between the discharge point and transport receptacle. The crop does leave the transfer device almost horizontally, but with increasing transfer distance, the crop stream will become slower and assume a curved trajectory. The distance measuring devices function with reference to the direction of ejection preset by the transfer device. Due to the curved trajectory of the crop stream, the point of impingement of the crop on the transport receptacle and the region detected by the distance measuring devices are different. This error results in unsatisfactory control.

SUMMARY OF THE INVENTION

It is an object of the present invention to overcome one or more of the above described deficiencies.

Another object is to calculate the angle between the transfer device and the longitudinal direction of the receptacle from the quantity which predetermines the direction of travel of the agricultural harvester.

In accordance with the present invention, there is provided an apparatus for the transfer of harvested crops from an agricultural harvester machine to a transport receptacle via a pivotable transfer device, and including means for controlling the angle between the transfer device and the longitudinal direction of the machine with reference to a quantity which predetermines the direction of travel of the agricultural harvester.

In accordance with another aspect, there is provided an apparatus for the transfer of harvested crops from an agricultural harvester machine to a transport receptacle via a pivotable transfer device on the agricultural harvester, and including means for moving the agricultural harvester in a longitudinal direction, means for trailing the transport receptacle at a location behind the agricultural harvester, computing means for determining an angle between the longitudinal direction of the agricultural harvester and a trailing direction of the transport receptacle, and means for controlling the angle between the transfer device and the longitudinal direction of the agricultural harvester to thereby direct the harvested crops from the transfer device into the transport receptacle.

The present invention is a relatively inexpensive, reliable and simple apparatus for controlling the transfer device.

BRIEF DESCRIPTION OF THE DRAWINGS

Reference is now made more particularly to the drawings which illustrate the best presently known mode of carrying out the invention and wherein similar reference characters indicate the same parts throughout the views.

DETAILED DESCRIPTION

Figure 1:
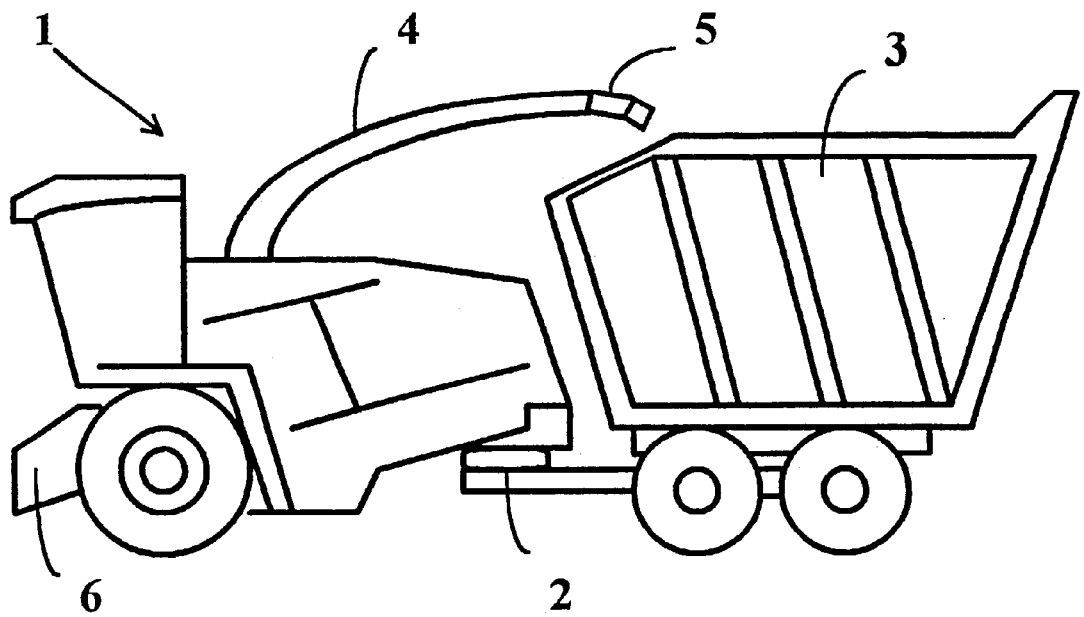
FIG. 1 is a side view of a self-propelled forage harvester with articulated frame steering and a trailing transport receptacle.

Generally, harvesting crop is performed with an agricultural harvester 1 along predetermined crop rows or swaths. To avoid crop loss, the rows or swaths are sown or deposited in a uniform pattern. Irregularities in the rows or swaths are largely leveled out by the front harvesting attachment when the crop is picked up. Changes in direction of travel when the crop is picked up are therefore only minor. From the quantity that predetermines the direction of travel, the transport receptacle's 3 location can be derived. The transfer device can then be controlled accordingly without response.

The self-propelled forage harvester 1 shown in FIGS. 1–4 has articulated frame steering about an articulation joint 2, and a transport receptacle 3 is mounted therebehind. The harvested crop is picked up from the harvesting area by a front harvesting attachment and fed by feed units 6 to a subsequent processing unit. The processed crop is then transferred via a transfer device 4 having an upper discharge chute which is adjustable in height, to the transport receptacle 3. Discharge flaps 5 predetermine the direction of ejection of the crop stream.

In a forage harvester 1 with articulated frame steering 2 in which the transport receptacle 3 is mounted directly on a trailing frame, the upper discharge chute 4 angle can be controlled in such a way that the crop is transferred, for example, in the direction of the center of the transport receptacle 3. Articulated frame steering is used on self-propelled pick-up loaders (i.e. a sugar beet pick-up loader and self-propelled forage harvester). A full transport receptacle 3 is emptied by a tipping device or floor conveyor to a further transport receptacle.

The type of control embodying the present invention is used when the crop is transferred to the trailing transport receptacle 3. The transport receptacle 3 can be transported in various ways behind a forage harvester 1. In one example, the transport receptacle 3 has its own running gear and is hitched to the forage harvester 1 via a ring hitch. It can be a transfer receptacle or an ordinary transport. It is possible to automatically control the upper discharge chute 4 on forage harvesters 1 independently of a transport receptacle detector. A response on the degree of filling or the relative position of the transport receptacle 3 to the forage harvester 1 can be dispensed with.

In the above examples of transfer of the crop to the transport receptacle 3, the transport receptacle 3 follows the track of the forage harvester 1 with a time lag and minor deviation. The transfer device is oriented approximately in the direction of a longitudinal axis 10 of the harvesting machine.

The apparatus for controlling the transfer device consists of an electronic analyzer or computer 20 with sensors 24, 25 for detection of the relative angular position of the quantity that predetermines the direction of travel of the agricultural harvester1 and of at least the relative angular position of the transfer device 4 to the longitudinal axis 10 of the harvester. The computer 20 is further coupled to an electronic bus system 29, so that further harvester parameters such as the ground speed and the position of other guide elements on the transfer device are available when determining the direction of transfer.

The computer 20 determines the quantity that predetermines the direction of travel of the forage harvester 1 and then, taking other parameters into account, calculates a nominal chute angle. From the control difference between actual chute angle and nominal chute angle is then derived a correcting variable for adjustment of the direction of transfer. During adjustment, utilizing adjusting means 32, 33 known in the art such as for example an electrohydraulic adjusting device, the speed of adjustment is then selected as a function of the correcting variable.

The calculation of the nominal transfer quantity is derived from simple tests. The angle of the transfer device relative to the longitudinal axis 10 of the combined harvester and transport receptacle which is necessary for directional transfer, hereinafter referred to as the chute angle, can be determined empirically and stored in memory of the computer 20 in the form of a data field or with the aid of a characteristic curve that can be determined therefrom. Also there is the possibility of performing control of the transfer device with the aid of definitions by theoretical calculations.

Figure 2:
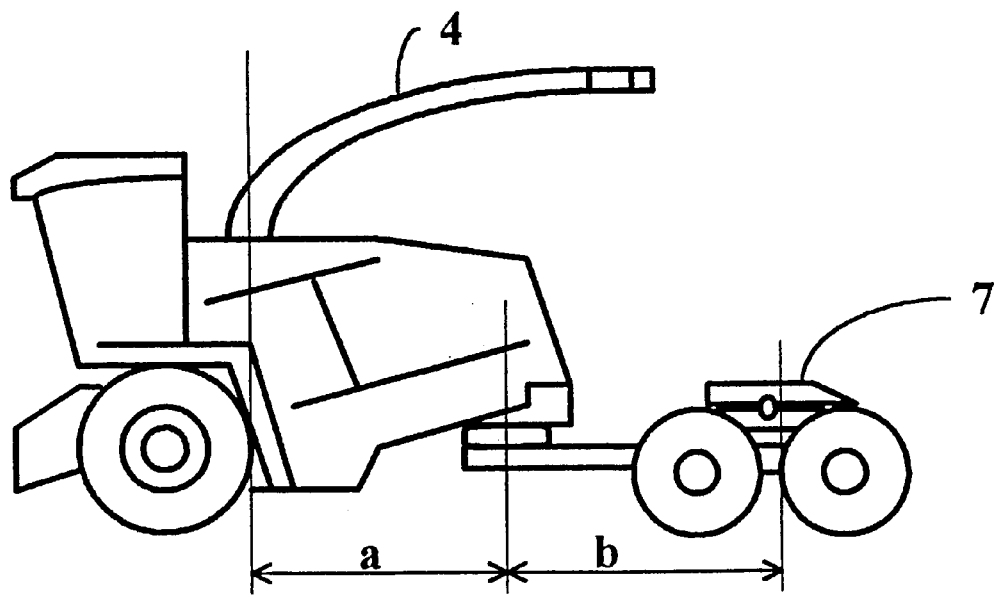
FIG. 2 is a side view of a self-propelled forage harvester with articulated frame steering and a semitrailer coupling.

A side view of the self-propelled forage harvester 1 with articulated frame steering 2 and semitrailer coupling 7, i.e. a fifth wheel, is shown in FIG. 2. Distance "a" is the distance between the vertical axis of rotation of the upper discharge chute 4 and the pivot point of the articulated frame steering 2. Distance "b" is the distance between the pivot point of the articulated frame steering 2 and the semitrailer coupling 7.

Figure 3:
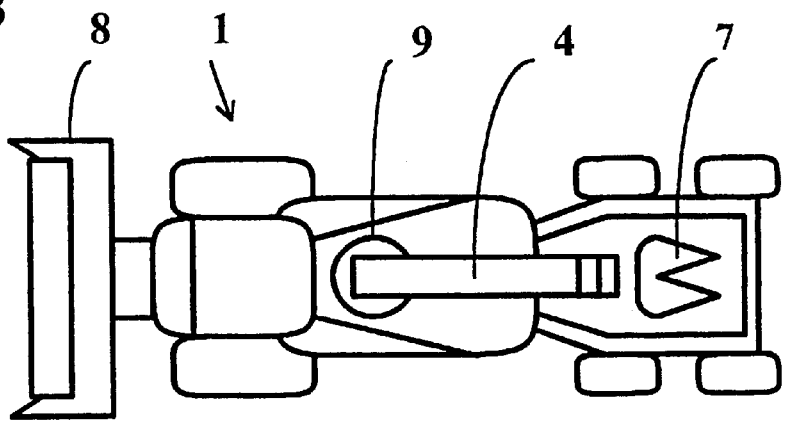
FIG. 3 is a top view of the FIG. 2 forage harvester.

A top view of the self-propelled forage harvester 1 with articulated frame steering 2, semitrailer coupling 7 and a mounted front harvesting attachment 8 is shown in FIG. 3. The forage harvester 1 is traveling straight ahead, and the quantity which predetermines the direction of travel of the agricultural harvester, here the angle of articulation, is therefore equal to zero. The transfer device, here an upper discharge chute 4, is oriented in such a way that the crop is spewed past the semitrailer coupling 7. Pivoting of the transfer device about its vertical axis can be performed by a planetary gear 9. The planetary gear 9 is driven in a forage harvester 1 by a hydraulic motor. The latter is driven by an electrohydraulic valve control system in the direction predetermined by the apparatus for controlling the transfer device. The relative position of the transfer device to the longitudinal axis 10 of the coupled harvester and transport is determined by sensors 24, 25 such as an incremental transducer with detection of the direction of rotation and fed to the computer 20.

Figure 4:
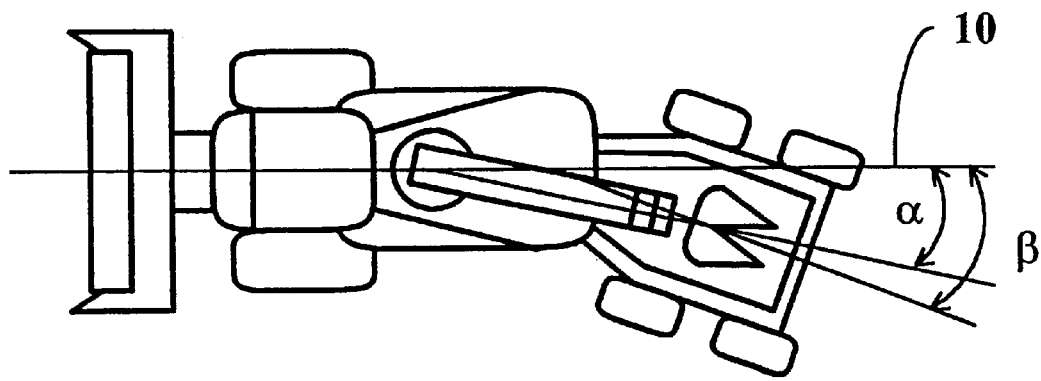
FIG. 4 is a top view as in FIG. 3 and illustrating a chute angle and an angle of articulation.

A top view of the self-propelled forage harvester 1 with turned articulated frame steering 2 is shown in FIG. 4. The angle a denotes an angle of articulation. This angle is the nominal quantity for control of the direction of transfer of the upper discharge chute 4. An angle reference α is the actual angle of the transfer device to the longitudinal axis 10 of the coupled harvester and transport. In this figure, the direction of transfer is controlled in such a way that the crop is conveyed beyond the semitrailer coupling 7.

If the apparatus is used on a forage harvester 1 with articulated frame steering 2 hitched to a semitrailer 11, the upper discharge chute 4 angle can be controlled in such a way that the crop stream is transferred in the direction of the center of the semitrailer coupling 7, when the transport receptacle 3 is located over the semitrailer coupling 7.

Figure 5:
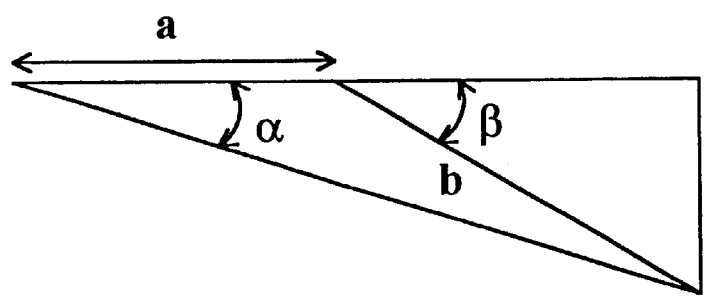
FIG. 5 is the view of the geometrical relationships of the forage harvester from FIGS. 2 and 4.

Whether a transport receptacle 3 or a semitrailer 11 is hitched to the forage harvester 1, the nominal chute angle can be calculated from the geometrical dimensions of the forage harvester 1 and the actual angle of articulation β. At what point the crop stream actually arrives in the transport receptacle 3 depends on the degree of filling and on the position of other crop stream guiding elements, such as chute height or chute flap. A geometric schematic derived from the calculation quantities of FIGS. 2 and 4 used to calculate the upper discharge chute 4 angle is shown in FIG. 5. The forage harvester's 1 geometrical dimensions "a" and "b" are known distances. The angle β is determined by the sensing means 24, 25 in the articulated frame steering 2. From the known quantities, angle α of the transfer device can then be calculated according to the following equation:

$$\alpha = \arctan\left(\frac{b \times \sin\beta}{a + b\cos\beta}\right)$$

From the calculations derived from this equation, the transfer device can be controlled to direct the crop stream past the semitrailer coupling 7. Further, the last mentioned equation can be used to control the transfer device when the transport receptacle 3 is mounted directly on the articulated control arm. Distance "b" is a remote location with respect to the articulated frame steering 2 where the crop stream is to be directed. Distance "b" is fed to the electronic analyzer 20 as a standard value by a simple presetting device (i.e. a potentiometer). A change as a function of the transfer distance of the transfer device is another possibility. The direction of transfer is controlled by this presetting device in such a way that the crop stream is transferred in the direction or via this point.

Figure 6:
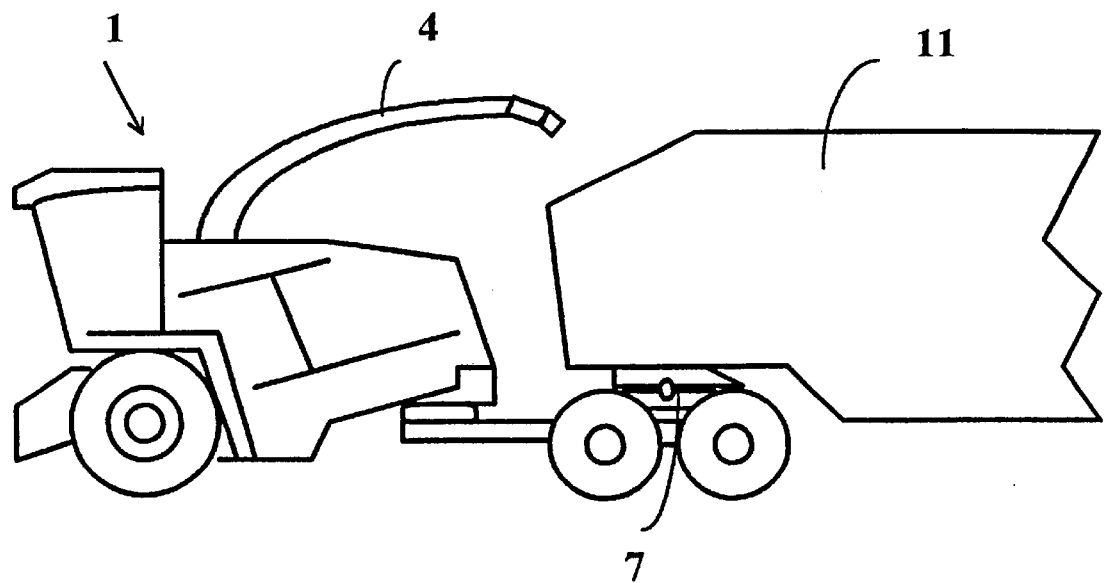
FIG. 6 is a side view as in FIG. 2 but with a coupled semitrailer.

A side view of a self-propelled forage harvester 1 with articulated frame steering 2 and hitched semitrailer 11 is shown in FIG. 6. The forage harvester 1 can also be fitted with a semitrailer coupling 7 at the rear. The semitrailer 11 is hitched and towed behind the forage harvester 1 during filling. These semitrailers 11 can be quickly exchanged for an empty semitrailer 11 from the forage harvester 1 by the semitrailer coupling 7. Further, there is also the possibility of integrating a transport receptacle 3 on the chassis of the forage harvester 1. The full transport receptacle 3 is then transferred to a transport receptacle by means of a floor conveyor or tipping device.

With this configuration, there is also the possibility of determining the angle between the longitudinal axis 10 of the transport receptacle 3 and the semitrailer coupling 7. From this sensed value, extended control of the transfer device 4 can then be carried out. The direction of transfer can then also deviate from the alignment with the semitrailer coupling 7. Furthermore, by this means it is possible to align the transfer device 4 with points located behind the fifth wheel coupling 7. By means of a measured transfer distance, there is then also the possibility of varying the transfer target distance and obtaining reliable transfer.

Figure 7:
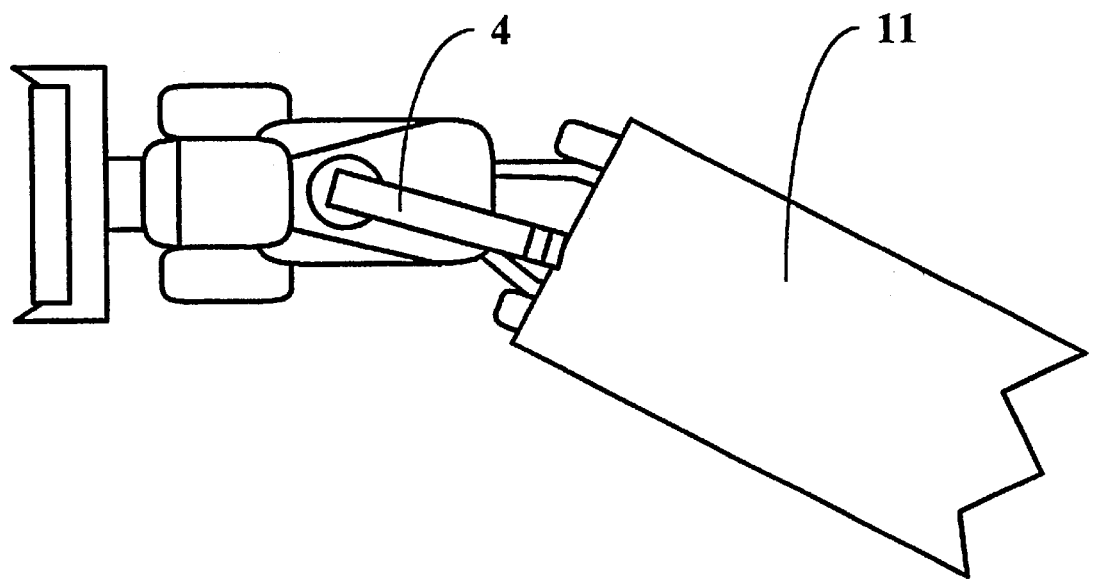
FIG. 7 is a top view of the FIG. 6 forage harvester and hitched semitrailer in an articulated position.

A top view of the forage harvester 1 towing a semitrailer 11 momentarily traveling along a bend is shown in FIG. 7. Here the upper discharge chute 4 is oriented in such a way that the direction of transfer, hence crop stream, is aligned with the semitrailer coupling 7.

Figure 8:
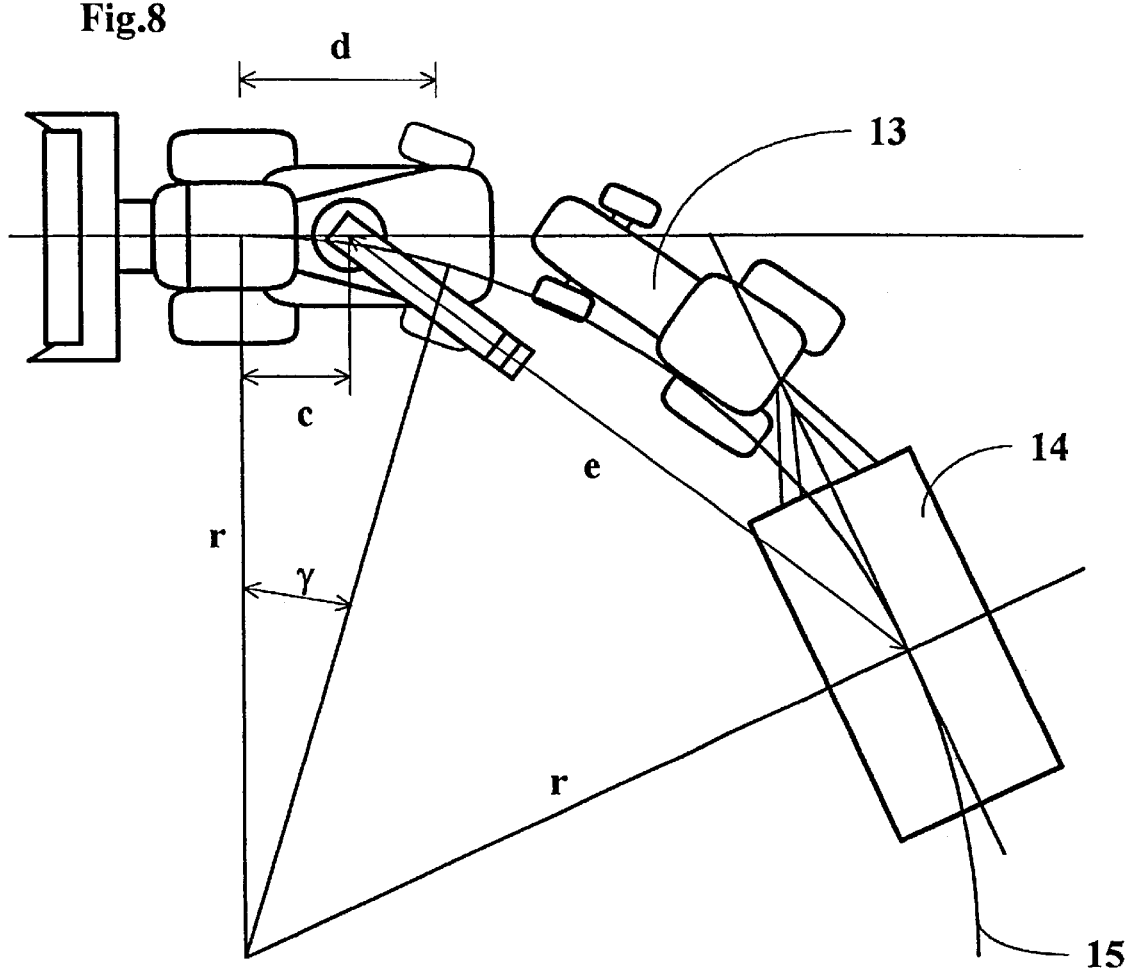
FIG. 8 is a top view of a stub axle-steered self-propelled forage harvester with a following tractor-drawn transport receptacle.

FIG. 8 shows the possibility of a self-propelled transport receptacle or a transport receptacle 14 towed directly behind the forage harvester 1 by a tractor 13 or the like. The direction of travel of the forage harvester 1 is generally predetermined by the steering angle of a stub axle-steered steering axle. The direction of travel can be further predetermined by a rotation about a vertical axis of frame portions, with each associated with at least one rigid axle. The stub axle-steered self-propelled forage harvester 1 and independent trailing tractor 13 with hitched transport receptacle 14 is shown in FIG. 8. The path traveled is a curved track 15 with a constant radius of curvature. The forage harvester's 1 steering angle "γ" and wheelbase "d" can be used to calculate the radius of curvature "r". The assumption is that the distance "c" compared with the transfer target distance "e" is minimal and with the aid of trigonometry and the set of short sides of a right-angled triangle, the chute angle α can be calculated with reference to the following equation:

$$a = \arcsin\left(\frac{e}{2 \times r}\right)$$

If there is no direct coupling to the transport receptacle 3, control of the chute angle β can be performed with the aid of the quantity which predetermines the direction of travel and a transfer target distance. This transfer target distance can be a prefixed distance or a quantity that can be preset by the harvester operator. Further, the transfer target distance can be calculated from the elements which determine the transfer distance of the transfer device. The transfer distance can be derived from the settings of the transfer device by converting, for example, the chute height, the chute flap position and the transfer target height to the transport receptacle 3, to a transfer target distance.

Figure 9:
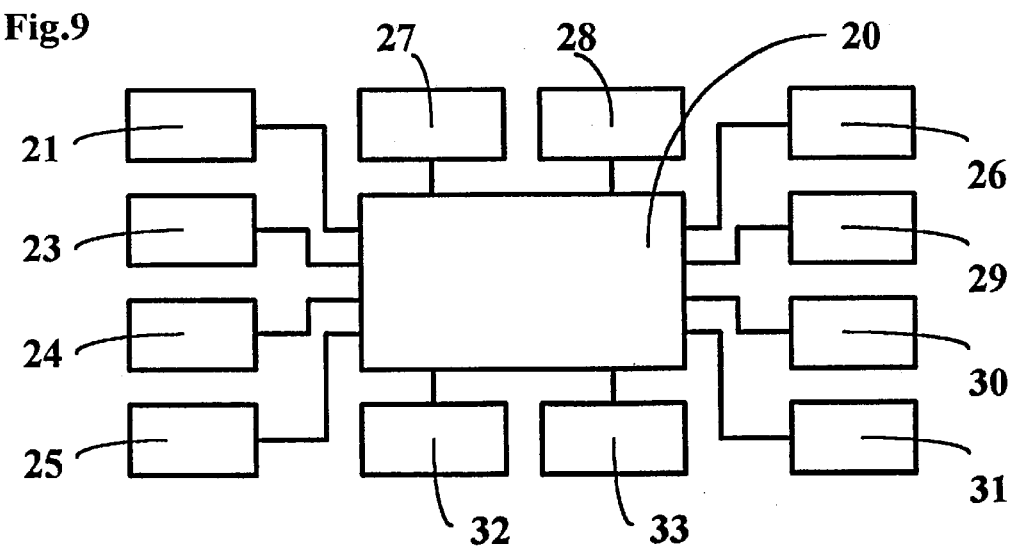
FIG. 9 is a block diagram of an apparatus for controlling a transfer device on an agricultural machine.

A block diagram of the apparatus for controlling a transfer device is shown in FIG. 9. The apparatus consists of the electronic analyzer 20, other sensors and actuators. Control of the transfer device is activated or deactivated by a button 21. The status of the apparatus is indicated by an optical or acoustic indicator 31. The standard transfer target distance "e" can be selected by a scaled potentiometer 22. If the transfer target distance "e" is to be derived from the instantaneous settings 24, 25, 26 of the transfer device and a standard target height, this can be done by actuation of the button 23. The chute angle α and the discharge flap angle are detected by the sensing means 24 or 25, preferably as potentiometer values. The height of the transfer device is derived from determination of the chute height angle 26. Further buttons 27 or 28 are provided for manual control of the transfer device and presetting an offset. The quantity which predetermines the direction of travel of the forage harvester 1 is determined by a sensing device 30. The electronic analyzer 20 is further connected to the bus system 29 of the forage harvester 1. Under this system, machine-specific settings (i.e. wheelbase), necessary geometrical data, transfer ratings (i.e. transfer target height) and variable values (i.e. ground speed) are transmitted. To adjust the direction of transfer, the electronic analyzer 20 is connected to adjusting elements 32, 33. These adjusting elements 32, 33 can be a hydraulic pump and motor combination or, as designed here, two electrohydraulic valves for an ordinary left/right hydraulic motor control system.

In one embodiment the transfer target distance can be programmed into the computer 20. The transfer device is, for example, set manually so that the crop stream is transferred to the center of the transport receptacle 3. This transfer distance is then programmed as a further transfer target distance. In case of further automatic control of the direction of transfer, a manually performed change of transfer distance, for example, the chute flap position, is then not further taken into consideration.

The transfer device is pivoted for example by means of a hydraulic motor. It is another embodiment that the pivot speed of the transfer device can be performed with variable speed. The inertia of the transfer device means that the pivot device runs on after switching off the pivot drive in case of automatic pivoting can result in overshooting the desired position. This problem can be solved in two possible ways. First, the drive can be switched off before reaching the nominal position. Second, the pivot speed can be adjusted towards zero as far as the nominal position. The variation in pivot speed needs separate control with proportional valves. A simple solution to the problem is achieved by multi-stage pivot speed control. At its simplest, this is done by two-stage valve switching. The pivot speed can be derived from the quantity of the correcting variable at which the transfer device is automatically pivoted. On falling below a given correcting variable, the pivot drive is then switched to a reduced pivot speed. The nominal direction of transfer can thus be controlled with sufficient precision.

In another embodiment, the apparatus detects the track covered by the forage harvester 1. As mentioned above, the transport receptacle 3 follows the forage harvester 1 at a distance when transferring crops. If a new direction of travel is selected by the machine operator, that is to say, the harvester carries on traveling with an altered radius of curvature, there is also a change in the relative direction of the transfer device to the transport receptacle 3. If the transport receptacles 3 directly coupled to the forage harvester 1, the transfer device can be adjusted without delay to the new direction of transfer. If there is no direct coupling, the transfer device must be controlled with reference to a given standard. As the transport receptacle 3 follows behind, it must first still remain on the old, past track of the forage harvester 1 until the track with the new radius of curvature begins. The direction of transfer must therefore be controlled in such a way that the crop stream enters the transport receptacle 3 located on the past track.

The transfer device 4 is advantageously controlled with reference to the track covered. For a new radius of curvature or a new quantity which predetermines the direction of travel of the forage harvester 1, the apparatus predetermines a new nominal chute angle α. But the latter is not set immediately by the apparatus, rather as a function of a track covered. The correlation is, for example, a linear relationship. The track covered can easily be derived from detection of the ground speed.

In another embodiment, the pivot speed of the transfer device 4 is controlled as a function of the ground speed of the harvester 1. The result is also track-dependent or delayed changes in direction of transfer. Track-dependent control has the advantage that, when the machine stops and at the same time the quantity which predetermines the direction of travel of the forage harvester 1 changes, the direction of transfer is not altered automatically.

The track covered is stored in memory of the computer 20 in conjunction with the quantity which predetermines the direction of travel in another embodiment of the apparatus. From the stored values, the course of the track covered can be determined. By using a ring memory only, a small number of values are kept on standby for calculation of the track covered. These memory contents are updated with a new data pair in a given time cycle or advantageously only after traveling a given track distance.

With additional data such as a programmed transfer target distance and height, the direction of transfer is controlled in such a way that the crop stream enters the transport receptacle 3 located on the past track. From the individual stored pairs of values, the course of the track covered is calculated from the instantaneous position. The individual pairs of values contain a track distance and each one associated quantity which predetermines the direction of travel of the forage harvester 1. From the two values, the forage harvester's 1 change in position can be determined, starting from a coordinate system oriented by the instantaneous direction of travel. Calculation of the course of the track covered is not very accurate. Changes in the quantity which predetermines the direction of travel of the forage harvester 1, between the storage of adjacent pairs of values, are not detected. Furthermore, the track is subject to slippage. If the direction of transfer is not exactly aligned, this is compensated first by the width of the transport receptacle 3 and a subsequent correction of the course of travel of the transport receptacle. It is further provided that control of the transfer device is possible at any time by manual control of the direction of transfer without deactivating automatic control of the transfer device as a result. The manually entered offset is maintained until the next manual change or until deactivation of the apparatus.

An ordinary button connected to the control system of the apparatus is provided for activation or deactivation of the apparatus. This button can be, for example, a foot switch on the floor of the operator's cab of a forage harvester 1. Activation/deactivation of the apparatus is indicated each time by an acoustic signal or a visual display.

The invention is not limited to the control of the direction of transfer for the transfer of crops from the forage harvesters 1 to the following transport receptacles 3. It is obvious for those with ordinary skill in the art to apply the quantity which predetermines the direction of travel of the forage harvester 1 to other control functions of the transfer device. It is conceivable to apply the quantity which predetermines the direction of travel of the forage harvester 1 to control of the transfer distance of the device or within certain limits to control of the transfer device when the forage harvester 1 turns with transfer of the crops to a parallel-traveling transport receptacle 3. Furthermore, it is conceivable to use the transfer device to produce an adjustment of the guide flap on the upper discharge chute 4 or the chute angle α of a self-propelled forage harvester 1, in order to produce a kind of oscillating distributing movement.

While specific embodiments have been shown and described, this has been by way of illustration and not limitation, and the invention should not be limited except as required by the scope of the appended claims.

We claim:

1. An apparatus for the transfer of harvested crops from an agricultural harvester machine to a transport receptacle via a pivotable transfer device on the agricultural harvester, and including means for moving the agricultural harvester in a longitudinal direction, means for transporting the transport receptacle at a location behind the agricultural harvester, computing means for determining a steering angle of the agricultural harvester and a means for controlling the transfer device as a function of the steering angle of the agricultural harvester to thereby direct the harvested crops from the transfer device into the transport receptacle.

2. An apparatus for the transfer of harvested crops as set forth in claim 1, wherein the agricultural harvester and the transport receptacle are each mounted on a frame, and including an articulated joint interconnecting the frames, and means providing articulated frame steering mounted for the agricultural harvester.

3. An apparatus for the transfer of harvested crops as set forth in claim 1, wherein the agricultural harvester is a stub axle-steered agricultural harvester, the means for transporting the transport receptacle includes a separate tractor, and the means for controlling the transfer device is the steering angle of the stub axle-steered agricultural harvester.

4. An apparatus for the transfer of harvested crops as set forth in claim 1, wherein a transfer receptacle has a transfer target for the harvested crops; including means for determining a distance between the transfer device and the transfer target; and wherein the computing means utilizes the distance for controlling the transfer device as a function of the distance to thereby direct the harvested crops from the transfer device into the transport receptacle.

5. An apparatus for the transfer of harvested crops as set forth in claim 4, wherein the agricultural harvester and the transport receptacle are interconnected, and the transfer target distance is a machine-specific distance.

6. An apparatus for the transfer of harvested crops as set forth in claim 4, wherein the transfer target distance is determined utilizing a position of elements of the transfer device.

7. An apparatus for the transfer of harvested crops as set forth in claim 4, wherein the transfer target distance is programmed into the computing means.

8. An apparatus for the transfer of harvested crops as set forth in claim 1, including means for pivoting the transfer device at a variable pivot speed.

9. An apparatus for the transfer of harvested crops as set forth in claim 8, wherein the transfer device has a plurality of pivot speeds.

10. An apparatus for the transfer of harvested crops as set forth in claim 9, wherein the computing means controls the means for pivoting the transfer device.

11. An apparatus for the transfer of harvested crops as set forth in claim 10, wherein the computing means has a memory; and wherein a path taken by the agricultural harvester and the steering angle of the agricultural harvester are stored in the memory.

12. An apparatus for the transfer of harvested crops as set forth in claim 11, wherein the direction and height of transfer is calculated from values stored in the memory; whereby the harvested crop stream enters the transport receptacle at a predetermined transfer distance and height.

13. An apparatus for the transfer of harvested crops as set forth in claim 10, including a manual control of the direction of transfer for manually adjusting the controlled pivoting of transfer.

14. An apparatus for the transfer of harvested crops as set forth in claims 13, wherein the manual control includes a button for activating the control and an indicator for showing activation of the control.

15. An apparatus for the transfer of harvested crops from an agricultural harvester machine to a transport receptacle via a pivotable transfer device on the agricultural harvester, and including means for moving the agricultural harvester in a longitudinal direction, means for transporting the transport receptacle at a location behind the agricultural harvester, computing means for determining a steering angle of the agricultural harvester and a means for controlling the transfer device as a function of the steering angle of the agricultural harvester to thereby direct the harvested crops from the transfer device into the transport receptacle, wherein a transfer receptacle has a transfer target for the harvested crops; including means for determining a distance between the transfer device and the transfer target; and wherein the computing means utilizes the distance for controlling the transfer device as a function of the distance to thereby direct the harvested crops from the transfer device into the transport receptacle, wherein the agricultural harvester and the transport receptacle are interconnected, and the transfer target distance is a machine-specific distance and further including an articulation joint and a fifth wheel coupling located behind the articulation joint, and wherein the transfer target distance is a distance between the articulation joint and the fifth wheel coupling.

16. An apparatus for the transfer of harvested crops from an agricultural harvester machine to a transport receptacle via a pivotable transfer device on the agricultural harvester, and including means for moving the agricultural harvester in a longitudinal direction, means for transporting the transport receptacle at a location behind the agricultural harvester, computing means for determining a steering angle of the agricultural harvester and a means for controlling the transfer device as a function of the steering angle of the agricultural harvester to thereby direct the harvested crops from the transfer device into the transport receptacle, wherein the transfer device has a plurality of pivot speeds and the computing means controls the means for pivoting the transfer device, and further including a means for measuring the ground speed of the agricultural harvester, and wherein the pivot speed is controlled as a function of the ground speed of the agricultural harvester.

17. An apparatus for the transfer of harvested crops from an agricultural harvester machine to a transport receptacle via a pivotable transfer device, and including means for controlling the angle between the transfer device and the longitudinal direction of the machine with reference to a predetermined quantity which predetermines the direction of travel of the agricultural harvester and a covered track distance.

\* \* \* \* \*